United States Patent [19]

Hsu

[11] Patent Number: 5,121,296
[45] Date of Patent: Jun. 9, 1992

[54] COMPUTER HOUSING ASSEMBLY WHICH CAN BE ASSEMBLED AND DISASSEMBLED WITHOUT TOOLS

[76] Inventor: Kai Hsu, 1st Fl., No. 42, Lane 103, Sec. 1, Hsin Sheng S. Road, Taipei, Taiwan

[21] Appl. No.: 712,437

[22] Filed: Jun. 10, 1991

[51] Int. Cl.⁵ .......................... H05K 5/00; H05K 7/00; G06F 1/00
[52] U.S. Cl. .................................. 361/395; 361/391; 361/399; 361/380
[58] Field of Search ................ 364/708; 361/380, 390, 361/391, 392, 393, 394, 395, 399

[56] References Cited

U.S. PATENT DOCUMENTS

| | | | |
|---|---|---|---|
| 4,725,244 | 2/1988 | Chewning et al. | 361/391 X |
| 4,742,477 | 5/1988 | Phillips et al. | 364/708 |
| 4,745,524 | 5/1988 | Patton, III | 361/399 |
| 4,841,412 | 6/1989 | Heys, Jr. et al. | 364/708 X |
| 4,901,205 | 2/1990 | Landis et al. | 361/399 X |
| 4,926,291 | 5/1990 | Sarraf | 361/392 X |
| 4,937,771 | 6/1990 | Rumps, Jr. et al. | 361/380 X |
| 4,964,017 | 10/1990 | Jindrick et al. | 361/390 |
| 4,979,075 | 12/1990 | Murphy | 361/399 |
| 4,992,903 | 2/1991 | Chen | 364/708 X |

Primary Examiner—Gerald P. Tolin
Assistant Examiner—Michael W. Phillips
Attorney, Agent, or Firm—Lowe, Price, LeBlanc & Becker

[57] ABSTRACT

A computer housing assembly, comprising a mainframe housing unit which is comprised of a base frame having a top cover attached thereto through plugin connection, a front panel unit attached to said mainframe housing unit through hooked joint which has two sliding covers attached thereto at two opposite ends through sliding joint for dust protection, a disk drive housing unit for holding disk drives by L-shaped fastening rods which can be drawn out of said mainframe housing unit and then pushed back into place, a power supply holder unit comprising a L-shaped supporting board having a stop plate at the top for holding a power supply unit in place, an interface card fastening unit comprising a plurality of fastening plate having each a plate spring for retaining an interface socket each in each interface slot, and a mother board fastening unit comprising an elongated frame having a plurality of stub tubes for fastening a mother board in place by a plurality of fastening elements through finger operation without the use of any tools.

8 Claims, 12 Drawing Sheets

COMPUTER HOUSING ASSEMBLY WHICH CAN BE ASSEMBLED AND DISASSEMBLED WITHOUT TOOLS

BACKGROUND OF THE INVENTION

The present invention relates to computer housings and relates more particularly to a tool-free computer housing assembly into which any peripheral devices can be conveniently installed without the use of any tools or screws.

The known structure of computer housing is generally comprised of a substantially U-shaped base shell covered with a substantially U-shaped cover forming an enclosed housing. Because the base shell has two open spaces at two opposite sides, the structural strength of the housing is relatively weak. Further, because the cover has two vertical side walls provided for covering the two open spaces of the base shell, it is very difficult to attach the cover to the base shell or detach it therefrom. During assembly, the cover must be attached to the base shell through two lateral sides and then set into position. After having been set into position, the cover is then secured in place by screws. Since compact structures easy to assemble have become the points of emphasis in designing commercial goods, the aforesaid disadvantages in the known structure of computer housing should be eliminated. The present invention has been accomplished to eliminate the aforesaid disadvantages. In the present invention, the top cover can be directly and easily attached to the base frame through a top mount and then firmly retained in position with a hook-joint without the use of any tools. Because the base frame is made from a rectangular casing having four vertical side walls connected together, the structural strength of the housing is greater.

SUMMARY OF THE INVENTION

The present invention is a computer housing assembly which is comprised of a mainframe housing unit, a front panel unit, a disk drive housing unit, a power supply holder unit, an interface card fastening unit and a mother board fastening unit. The mainframe housing unit is comprised of a base frame having a top cover attached thereto through plug-in connection. The front panel unit which is attached to the mainframe housing unit with a hooked joint has two sliding covers movably attached thereto at two opposite ends through a sliding joint for dust protection. The disk drive housing unit for holding disk drives which are fastened in place by L-shaped fastening rods is also provided. It can be drawn out of the mainframe housing unit and then pushed back into place. The power supply holder unit comprises a L-shaped supporting board having a stop plate at the top for holding a power supply unit in place. The interface card fastening unit comprises a plurality of fastening plates each having a plate spring for retaining an interface socket in each interface slot. The mother board fastening unit comprises an elongated frame having a plurality of stub tubes for fastening a mother board in place by a plurality of fastening elements through finger operation without the use of any tools.

BRIEF DESCRIPTION OF THE DRAWINGS

FIG. 1-1 is a fragmentary perspective view of the raised portion on the mainframe housing unit;

FIG. 6-1 is an exploded view of the structure of the fastening element and the raised track on the rectangular casing of the disk drive housing unit;

FIG. 11 illustrates fastening a plate on two adjacent stands to retain a socket for interface card in place;

FIG. 1-1 is a fragmentary sectional view of the structure of the stub tube;

DETAILED DESCRIPTION OF THE PREFERRED EMBODIMENT

Figure 1:
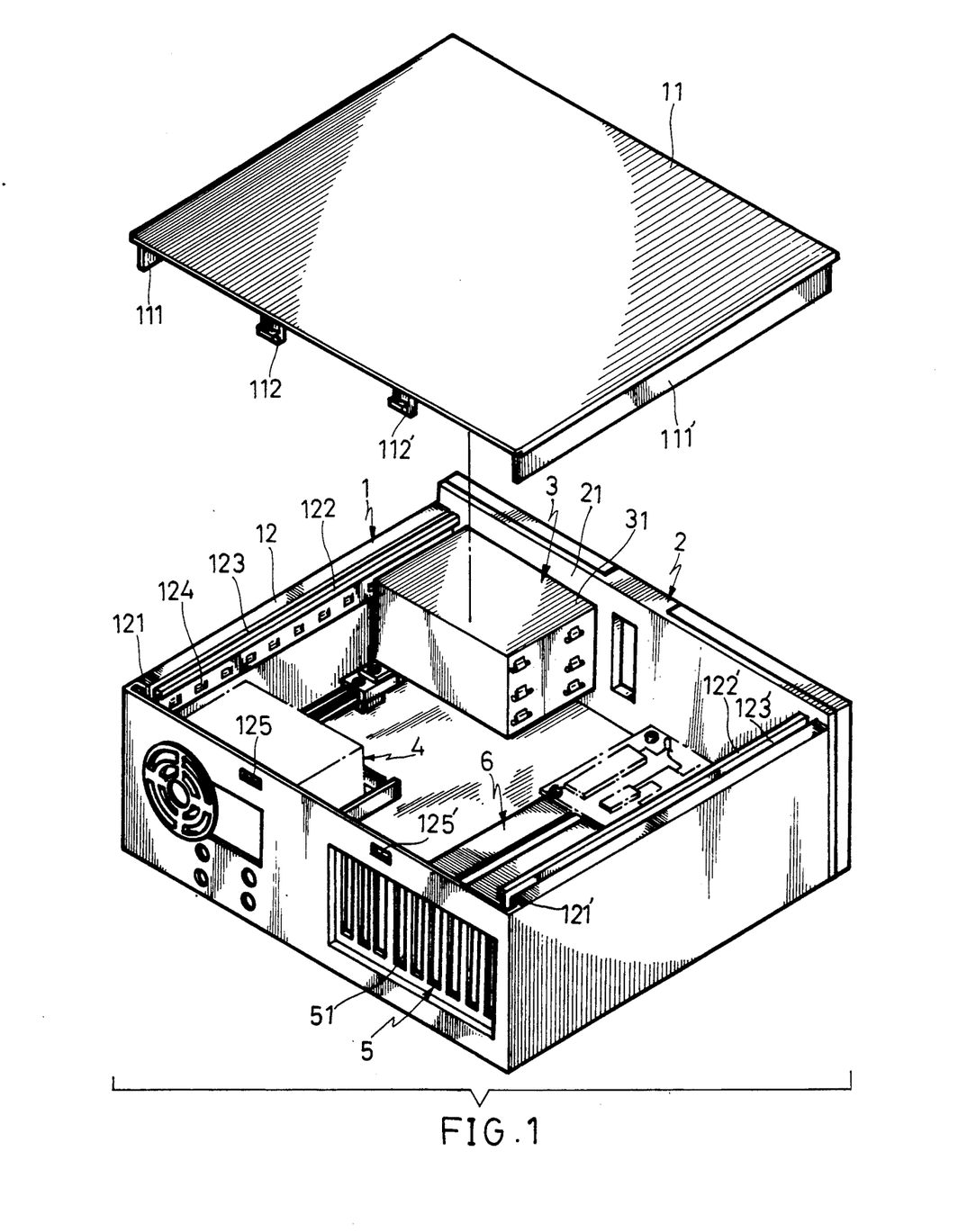
FIG. 1 is a perspective view of the first embodiment of the computer housing assembly of the present invention in which the top cover has been removed from place.

Referring to FIG. 1, a computer housing assembly in accordance with the present invention is generally comprised of a mainframe housing unit 1, a front panel unit 2, a disk drive housing unit 3, a power supply holder unit 4, an interface card fastening unit 5, and a mother board fastening unit 6.

Figure 2:
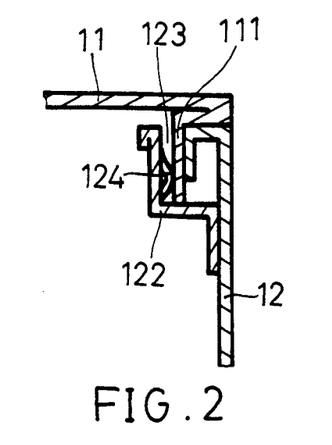
FIG. 2 is a fragmentary view in cross section of one connecting strip of the top cover fastened in the channel and retained in place by the raised portions of the elongated board at one side of the base frame.
Figure 3:
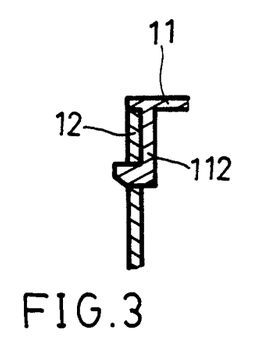
FIG. 3 is a fragmentary view in cross section of one hook of the top cover hooked in the corresponding retaining hole on the base frame of the mainframe housing unit.

As shown in FIG. 1, the mainframe housing unit 1 comprises a base frame 12 covered with a top cover 11 at the top. The top cover 11 is made of a flat board, having two opposite side edges respectively bent inwards and then vertically bent downwards forming into two connecting strips 111 and 111'. The top cover 11 further comprises two spaced hooks 112 and 112' respectively projecting downwards from the back end thereof. The base frame 12 has two vertical side walls upstanding from a flat bottom wall at two opposite sides, and a vertical back wall upstanding from said flat bottom wall at the back end thereof. The two top edges of the two vertical side walls of the base frame 12 are respectively bent inwards through horizontal direction and then vertically bent downwards forming into two bearing portions 121 and 121' respectively. The base frame 12 further comprises two spaced retaining holes 125 and 125' on the vertical back wall thereof. Two elongated boards 122 and 122' are respectively attached to the base frame 12 on the inner surface thereof at two opposite sides through point welding process and respectively disposed in parallel with the two bearing portions 121 and 121', defining therewith a channel 123 or 123' each. The two elongated boards 122 and 122' are made of resilient material, having each a plurality of raised portions 124 spaced from one another at equal interval and respectively projecting into the channel 123 or 123'. Referring to FIGS. 2 and 3, inserting the two connecting strips 111 and 111' of the top cover 11 into the two channels 123 and 123' causes the two connecting strips 111 and 111' to be firmly retained by the raised portions 124 of the two elongated boards 122 and 122'. At the same time, the two hooks 112 and 112' of the top cover 11 are respectively squeezed to hook in the two retaining holes 125 and 125' and, the front end of the top cover 11 is stopped against the front panel unit 2 at the inside. Therefore, the top cover 11 can be conveniently attached to the base frame 12 without the use of any screws or tools. Detaching the top cover 11 from the base frame 12 is also very easy. Squeezing the back end of the top cover 11 downwards causes the two hooks 112 and 112' to be respectively disconnected from the two retaining holes 125 and 125' and then, the top cover 11 is pulled upwards to separate from the base frame 12.

Figure 4:
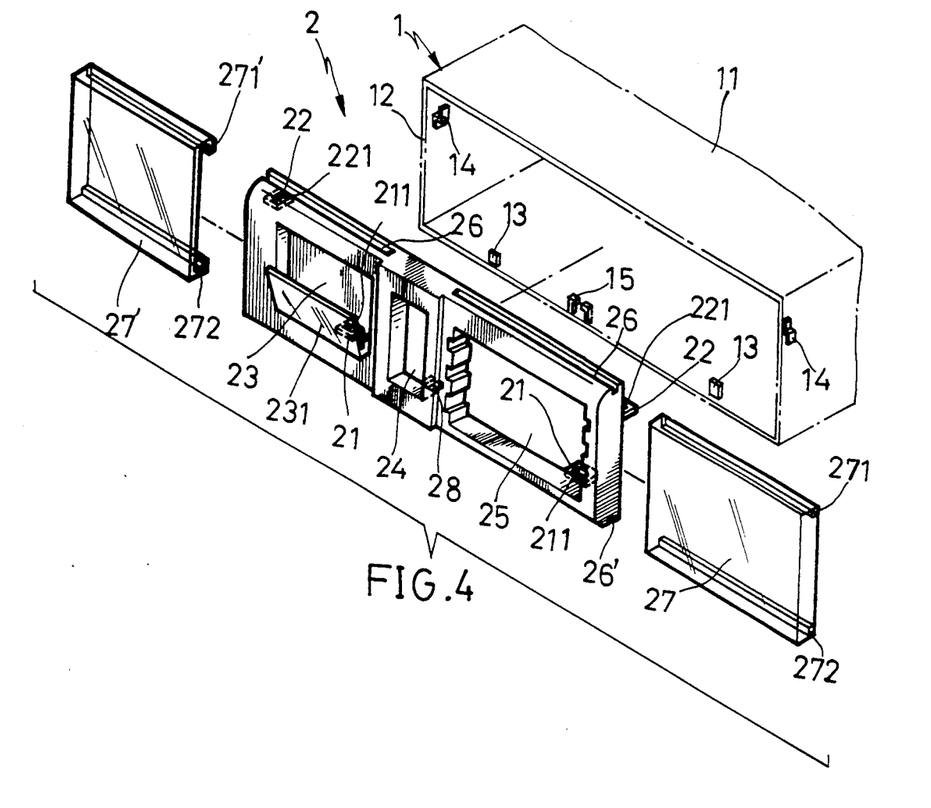
FIG. 4 is an exploded perspective view of the front panel unit.
Figure 5:
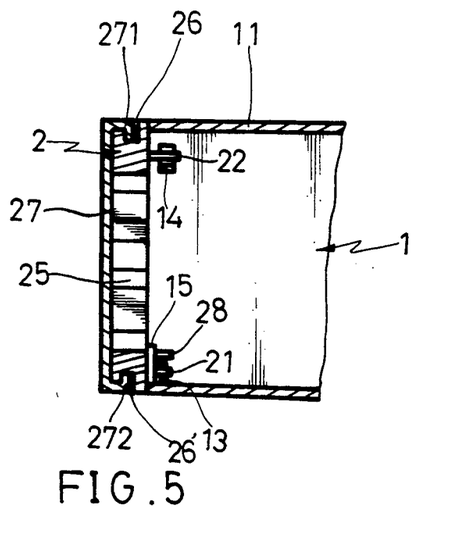
FIG. 5 is a fragmentary end view showing the front panel unit connected to the top cover and the base frame of the mainframe housing unit in cross section.

Referring to FIG. 4, the front panel unit 2 has a plurality of lugs 21 and 22 and a hook 28 respectively made on the back side thereof at suitable locations which lugs 21 and 22 have each a retaining hole 211 or 221 thereon. By fastening the lugs 21 and 22 and the hook 28 to the projecting strips 13 and 14 and the hook 15 which are respectively made on the base frame 12 at the inside at corresponding locations, the front panel unit 2 is firmly attached to the mainframe housing unit 1. The front panel unit 2 further comprises a recessed hole 23 on the left which is covered with a lid 231 and provided for keeping diskettes and small tools, a slot 24 at the middle for mounting a 3½" disk drive, and a hole 25 on the right for mounting the disk drive housing unit 3. Referring to FIG. 5, two pairs of sliding ways 26 and 26' are respectively made on the front panel unit 2 at two opposite ends for mounting two sliding covers 27 and 27'. The two sliding covers 27 and 27' have each a top edge and a bottom edge respectively bent inwards and then downwards forming into a top rail portion 271 or 271' and a bottom rail portion 272 or 272'. By inserting the top and bottom rail portions 271 and 272 or 271' and 272' into either pair of sliding ways 26 or 26', the two sliding covers 27 and 27' are conveniently attached to the front panel unit 2 through sliding joint to seal off dust.

Figure 6:
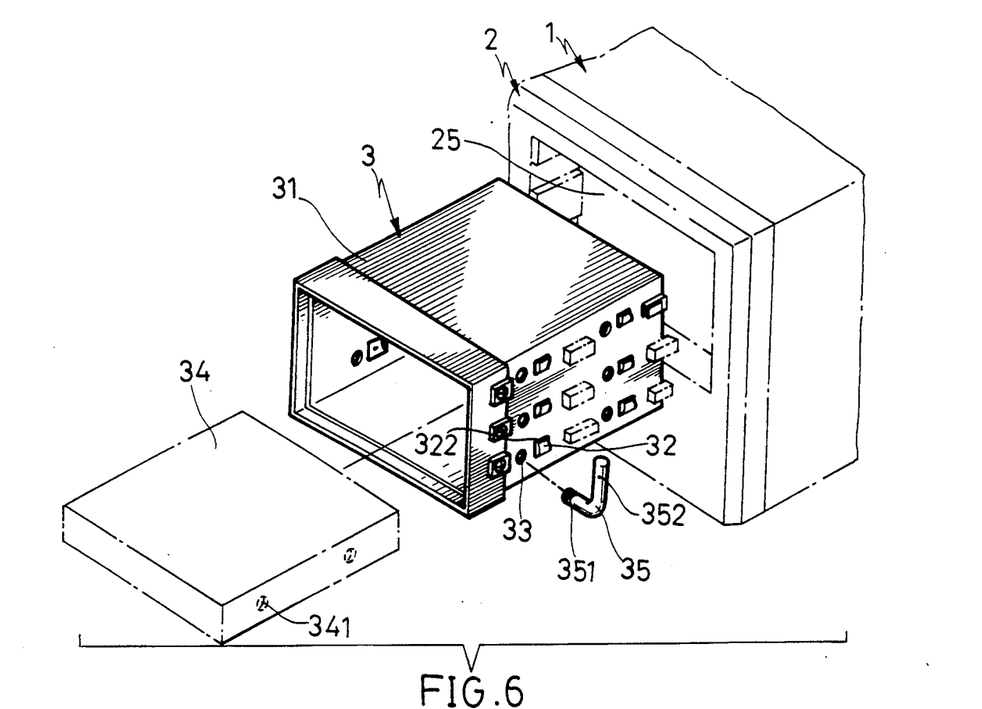
FIG. 6 is an exploded perspective view of the disk drive housing unit.
Figure 7:
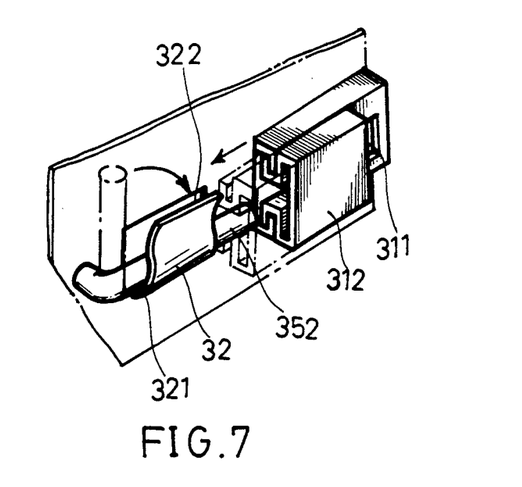
FIG. 7 illustrates the locating end of a L-shaped fastening rod rotated from a vertical to position to a horizontal position to be retained by the curved portion of the corresponding retaining strip.

Referring to FIGS. 6, 6-1 and 7 and seeing FIGS. 1 and 4 again, the disk drive housing unit 3 is to be fastened in the hole 25 of the front panel unit 2 for holding disk drives. It is comprised of a rectangular casing 31 having two rows of retaining strips 32 respectively projecting outwards from each of the two opposite sides thereof at two opposite, two rows of through-holes 33 on each of the two opposite sides thereof and respectively disposed in the front of said retaining strips 32, and an unitary track 311 raised from the back side wall thereof with a fastening element 312 movably fastened therein, wherein said retaining strips 32 have each a front end spaced from either of the two opposite side walls of the rectangular casing 31 with a gap 322 defined therebetween and a curved portion 321 at the middle. When a disk drive 34 which has bolt holes 341 on the two opposite side walls thereof is inserted in the casing 31, it can be conveniently fastened in place by L-shaped fastening rods 35 which have each a threaded end 351 at one end and a locating end 352 at an opposite end. As soon as the threaded end 351 of each L-shaped fastening rod 35 is fastened through either through-hole 33 on the casing 31 into either bolt hole 341 on the disk drive 34, the locating end 352 of each L-shaped fastening rod 35 is rotated from a vertical position to a horizontal position and inserted through the corresponding gap 322 to become firmly retained by the curved portion 321 of the corresponding retaining strip 32 and, the fastening element 312 is moved inwards in the track 311 to hold the locating end 352 of each L-shaped fastening rod 35. Through the aforesaid procedure, a disk drive can be conveniently fastened inside the disk drive housing unit 3. Screws may be used to replace the L-shaped fastening rods 35 for fastening a disk drive inside the disk drive housing unit 3.

Figure 8:
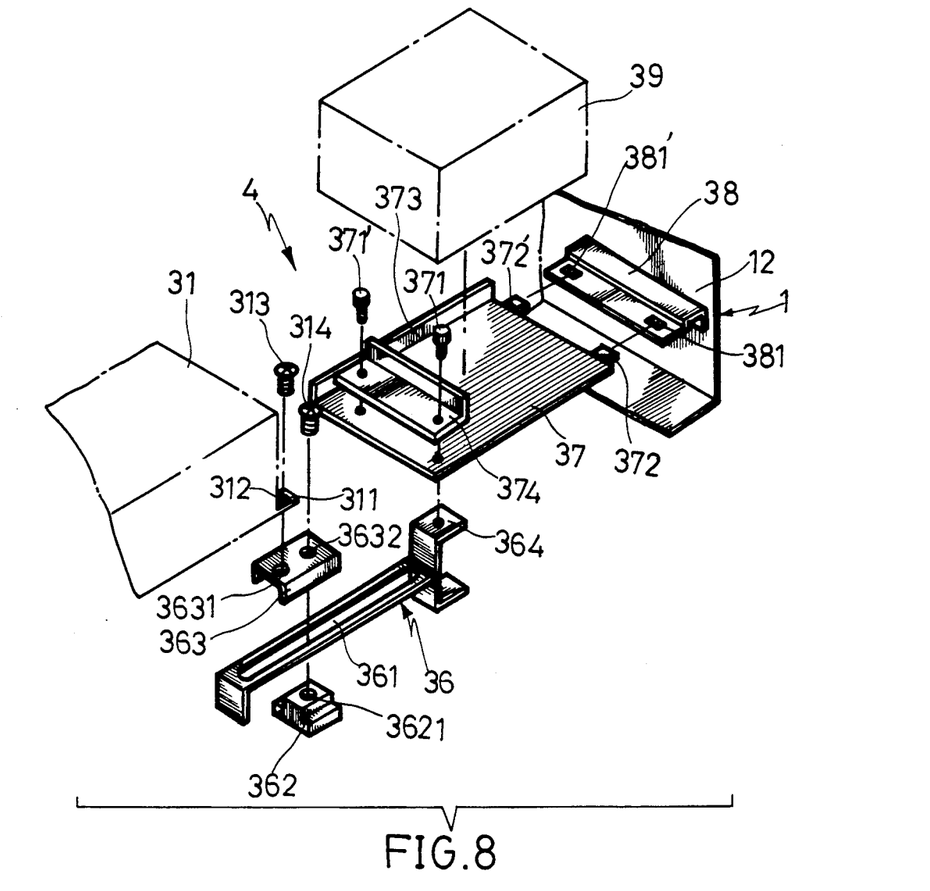
FIG. 8 is an exploded perspective view of the disk drive housing unit and the power supply holder unit.
Figure 9:
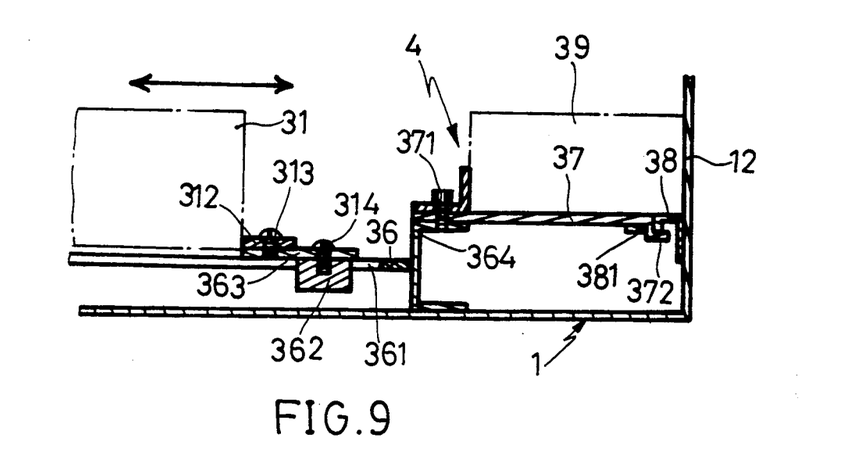
FIG. 9 is a sectional assembly view of the disk drive housing unit and the power supply holder unit.

Referring to FIGS. 8 and 9 and seeing FIG. 1 again, a supporting frame 36 is fastened in the mainframe housing unit 1, having an elongated slot 361 into which a sliding block 362 which has a bolt hole 3621 thereon is movably secured by a connecting board 363 which has a bolt hole 3631 and a through-hole 3632 thereon. The casing 31 of the disk drive housing unit 3 has a lug 311 at the rear end thereof which lug 311 has a through-hole 312 thereon. By fastening a screw 313 through the through-hole 312 on the lug 311 into the bolt hole 3631 on the connecting board 363 and another screw 314 through the through-hole 3632 into the bolt hole 3621 on the sliding block 362, the casing 31 of the disk drive housing unit 3 is connected to the supporting frame 36. Because the sliding block 362 and the connecting board 363 are respectively connected to the casing 31 of the disk drive housing unit 3 and permitted to slide in the elongated slot 361, the disk drive housing unit 3 can be drawn out of the mainframe housing unit 1 to provide much free space for mounting or checking mother boards, disk drive power lines or signal lines.

Referring to FIGS. 1, 8 and 9 again, the power supply holder unit 4 comprises a substantially L-shaped supporting board 37 having a vertical side wall 373 at one side, two spaced hooks 372 and 372' horizontally projecting outwards at one end, and a stop plate 374 fastened thereon at an opposite end by screws 371 and 371'. While fastening the stop plate 374 to the L-shaped supporting board 37, the L-shaped supporting board 37 is simultaneously fastened to the rear connecting end 364 of the supporting frame 36. There is also provided a bracket 38 on the base frame 12 of the mainframe housing unit 1 which bracket 38 has two retaining holes 381 and 381' at two opposite locations. By engaging the hooks 372 and 372' in the retaining holes 381 and 381' respectively, the L-shaped supporting board 37 is horizontally mounted on the supporting frame 36 for holding a power supply unit 39. After mounting, the power supply unit 39 is firmly retained between the vertical side wall 373 and the stop plate 374 as well as the base frame 12 of the mainframe housing unit 1.

Figure 10:
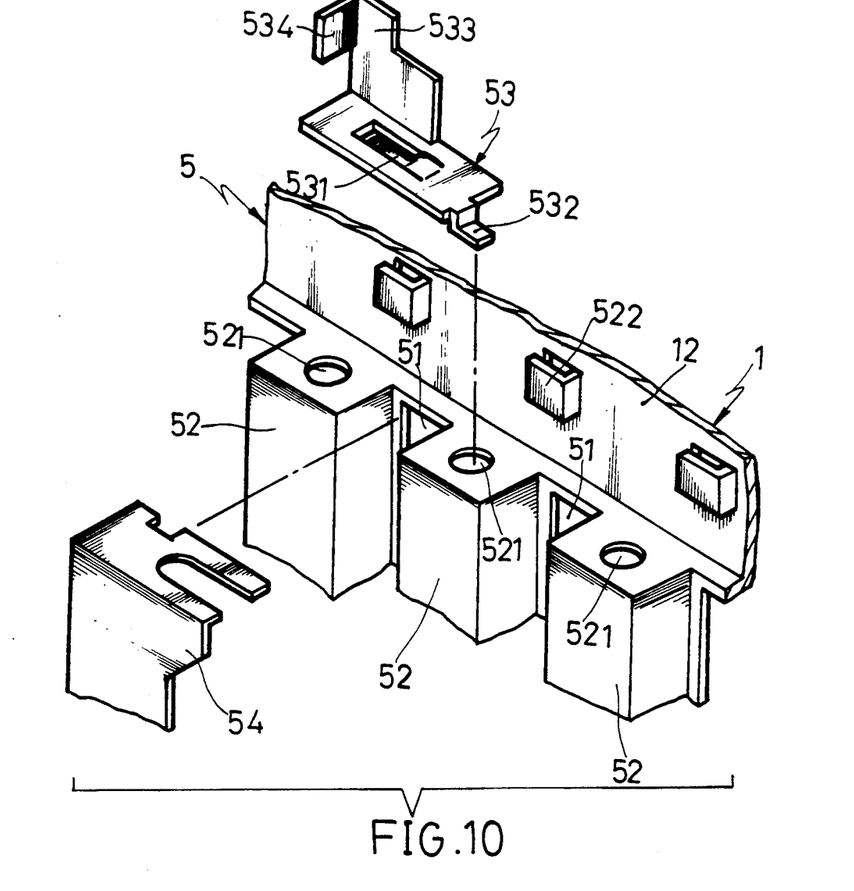
FIG. 10 is a exploded, fragmentary perspective view of the interface card fastening unit.
Figure 11:
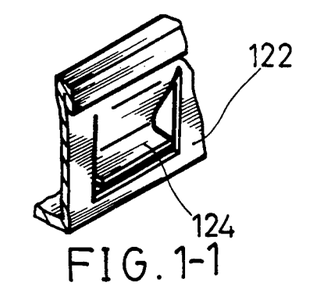
Figure 12:
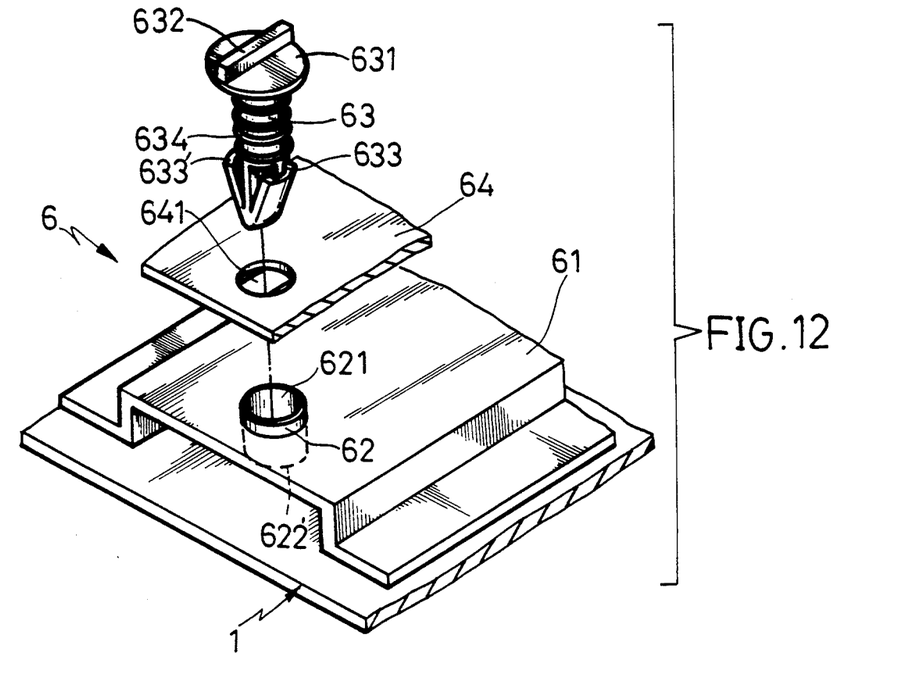
FIG. 12 is a exploded, fragmentary perspective view of the mother board fastening unit.
Figure 13:
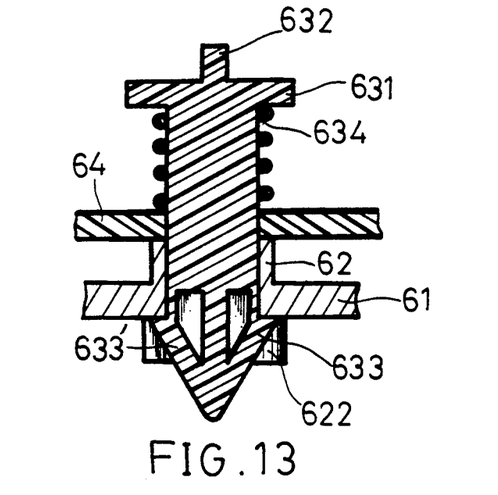
FIG. 13 is a fragmentary sectional elevation illustrating a mother board secured to the elongated frame by a fastening element.
Figure 14:
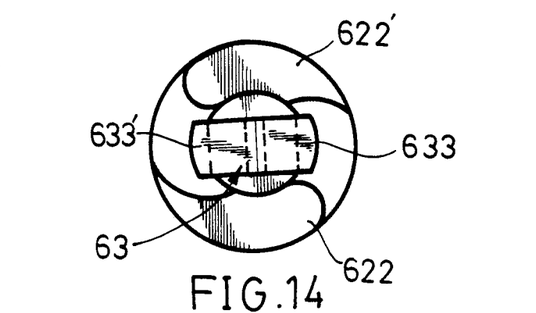
FIG. 14 illustrates the split cone fastened in a stub tube and disposed in a normal size condition.
Figure 15:
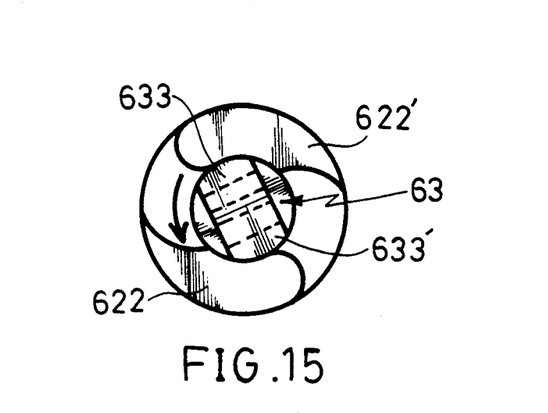
FIG. 15 illustrates the split cone squeezed inwards by the two eccentric flanges of the stub tube.

Referring to FIGS. 10 and 11 and seeing FIG. 1 again, the base frame 12 has a plurality of slots 51 on the vertical back wall thereof for inserting interface cards. The interface card fastening unit 5 is made on the mainframe housing unit 1 at the back around the slots 51, comprising a plurality of unitary supports 52 raising from the base frame 12 and respectively disposed at the two lateral sides by each slot 51, which supports 52 have each a fastening hole 521 on the top, a plurality of unitary clamps 522 projecting from the base frame 12 above the slots 51 and respectively disposed in one direction, and a plurality of fastening plates 53 respectively mounted on each two adjacent supports 52. Each fastening plate 53 has a unitary plate spring 531 obliquely projecting downwards at the bottom, a unitary projecting strip 532 at one end, a connecting portion 533 vertically disposed at one side and a finger-hold portion 534 extending from said connecting portion 533. When a socket for interface card 54 is set in either slot 51 between two adjacent supports 52, a fastening plate 53 is fastened in place by inserting the projecting strip 532 thereof into the fastening hole 521 on the stand at one side and the connecting portion 533 thereof into the corresponding clamp 522 above the slot 51, permitting the plate spring 531 thereof to firmly press on the socket for interface card 54. Thus, the socket for interface card 54 is firmly fastened in place without the use of any screws or tools. Of course, screws may be used to fasten sockets for interface cards 54 in the slots 51 respectively. The finger-hold portion 534 of each fastening plate 53 is provided for the holding of the fingers during installation of the fastening plate 53.

Referring to FIGS. 12, 12-1, 13, 14 and 15 and seeing FIG. 1 again, the mother board fastening unit 6 is fastened inside the base frame 12 of the mainframe housing unit 1. It is comprised of an elongated frame 61 having a plurality of stub tubes 62 for fastening a mother board 64 by a plurality of fastening elements 63, wherein each stub 62 has a through-hole 621 through the central axis thereof and two eccentric flanges 622 and 622' symmetrically disposed at the bottom end thereof; each fastening element 63 has an expanded head 631 which has an elongated block 632 raising from the top surface thereof at the middle, a split cone 633 and 633' at the bottom, and a compression spring 634 mounted thereon and disposed between said split cone 633 and 633' and said expanded head 631. The split cone 633 and 633' has an outer diameter slightly larger than the inner diameter of the through-hole 621 on each stub tube 62. When the split cone 633 and 633' is squeezed inwards, it is permitted to insert through the through-hole 621 on each stub tube 62. A mother board 64 in accordance with the present invention has a plurality of through-hole 641 made thereon at predetermined locations for fastening the fastening elements 63. By inserting the split cone 633 and 633' of each fastening element 63 through each corresponding through-holes 641 on the mother board 64 into the through-hole 621 on each corresponding stub tube 62, the mother board 64 is copnveniently fastened to the elongated frame 61 (once the split cone 633 and 633' passes through the through-hole 621, it immediately returns to its original size and becomes engaged with the bottom surface of the elogated fram 61). Rotating each fastening element 63 on each stub tube 62 causes the split cone 633 and 633' to be squeezed inwards by the eccentric flanges 622 and 622' and therefore, the compression spring 634 will force the corresponding fastening element 63 to move out of the corresponding stub tube 62. Through the aforesaid procedures, a mother board can be conveniently mounted on or removed from the mother board fastening unit 6.

Figure 16:
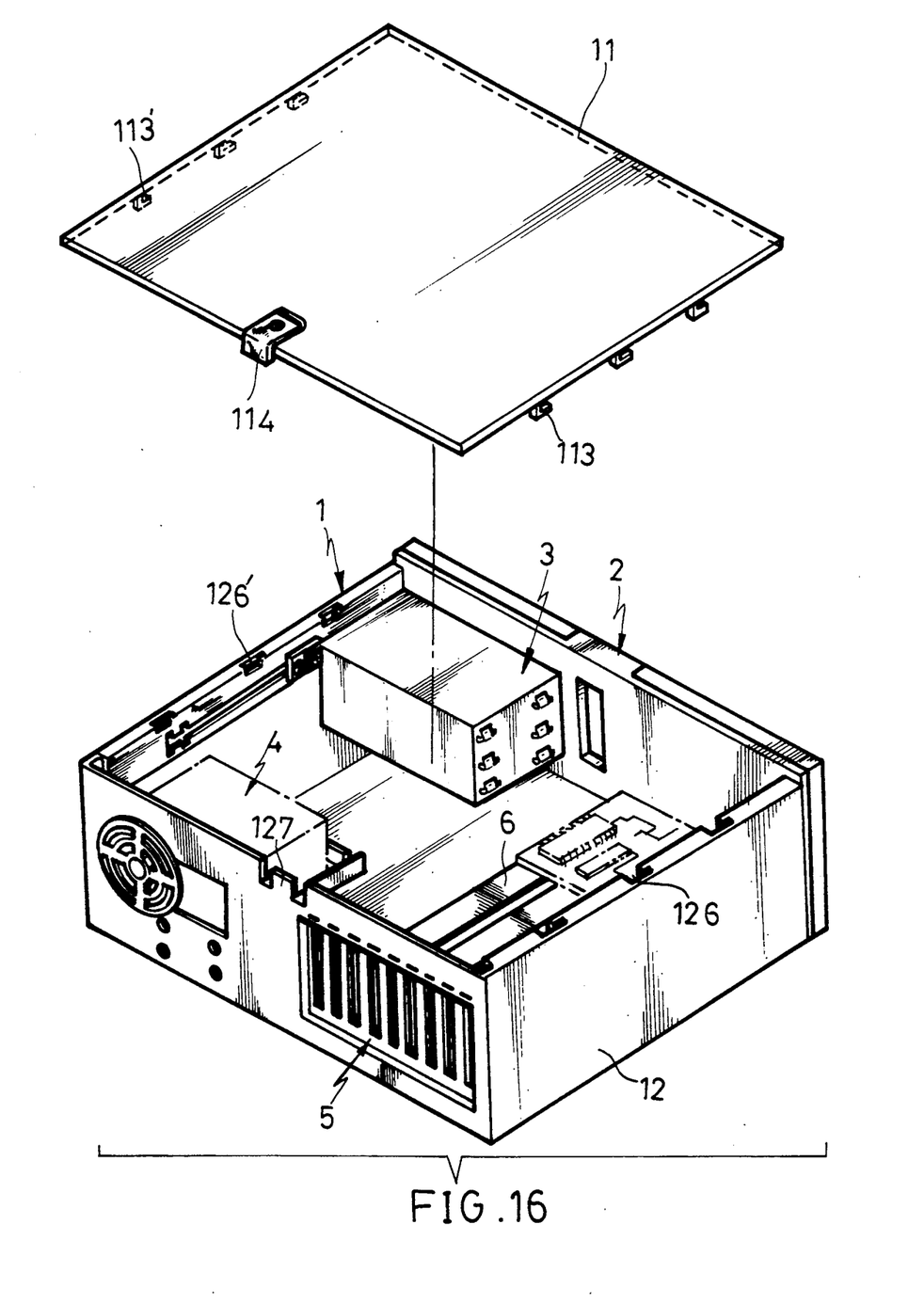
FIG. 16 is a perspective exploded view of a second embodiment of the present invention.
Figure 17:
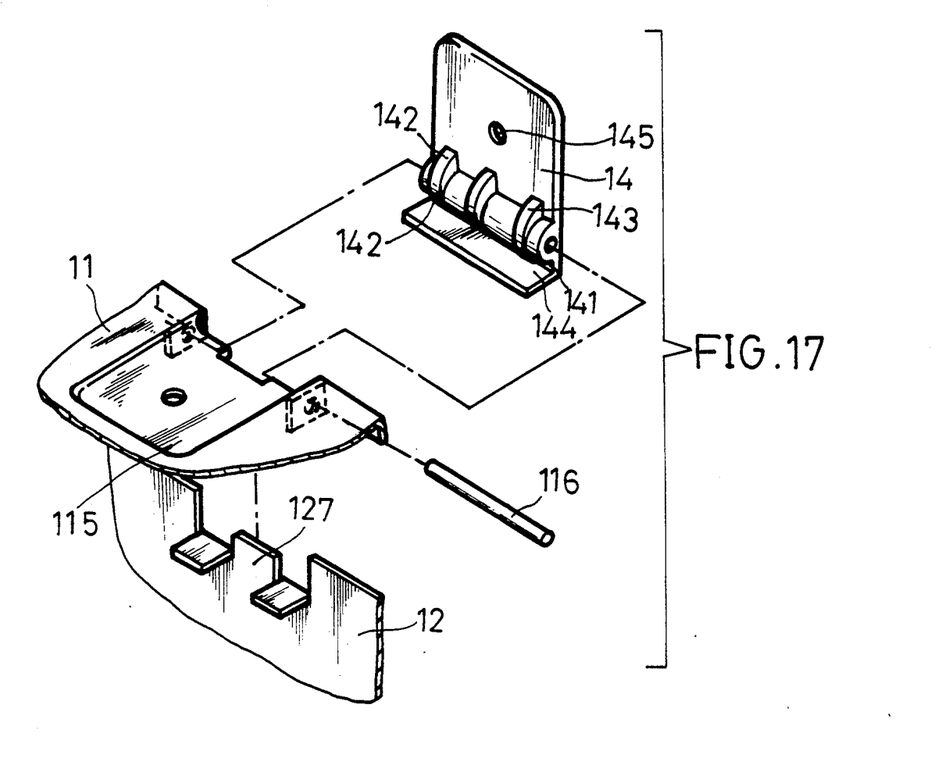
FIG. 17 is an exploded fragmentary view of the mainframe housing unit of the second embodiment of the present invention.
Figure 18:
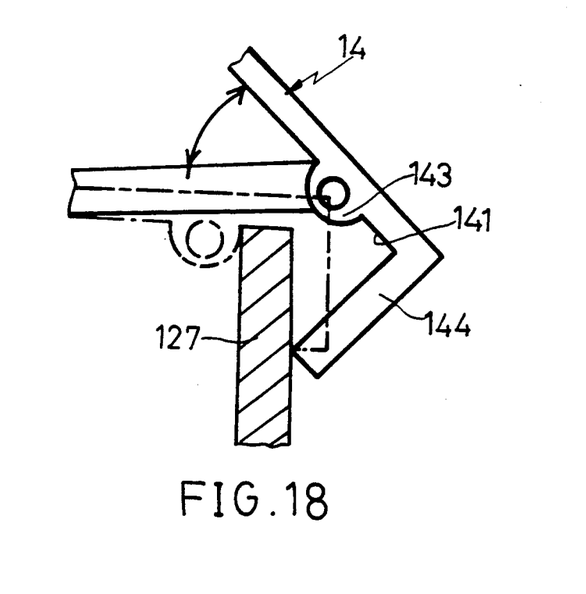
FIG. 18 is a fragmentary view showing fastening the mainframe housing unit of the second embodiment of the present invention into shape.

Referring to FIGS. 16, 17 and 18, therein illustrated is a second embodiment of the present invention. In this embodiment, the top cover 11 of the mainframe housing unit 1 has a plurality of hooks 113 and 113' symmetrically disposed at two opposite end edge and a control plate 114 at the back side edge and, ccorresponding to the hooks 113 and 113' and the control plate 14, the base frame 12 thereof has retaining notches 126 and 126' symmetrically disposed on the top at two opposite ends and a locating strip 127 on the top at the back side. The top cover 11 further comprises a recessed seat 115 for fastening the control plate 14 by a pin 116. The control plate 14 is made from a substantially L-shaped plate having a stop plate portion 144 at one end, a retaining gap 141 transversely formed in the contained angle thereof, a bolt hole 145 at a suitable location opposite to said stop plate portion 144, and a plurality of flanges 142 and 143 raised from the pin hole thereof which pin hole is transversely made at the contained angle thereof for fastening the pin 116. During assembly, the hooks 113 and 113' are respectively fastened in the retaining notches 126 and 126' and then, the top cover 11 is moved inwards on the base frame 12 causing the retaining gap 141 in the control plate 14 to engage with the locating strip 127, and therefore, the top cover 11 becomes firmly retained to the base frame 12. Detaching the top cover 11 from the base frame 12 is quite simple. Turning the control plate 14 upwards causes the stop plate portion 144 to serve as a bearing point (of a lever) and, the retaining gap 141 is forced, while keeping to turn the control plate 14 upwards, to disconnect from the locating strip 127, thus, the top cover 11 becomes automatically disconnected from the base frame 12. Fastening screw may be inserted through the bolt hole 145 to fixedly fasten the top cover 11 to the base frame 12.

Figure 19:
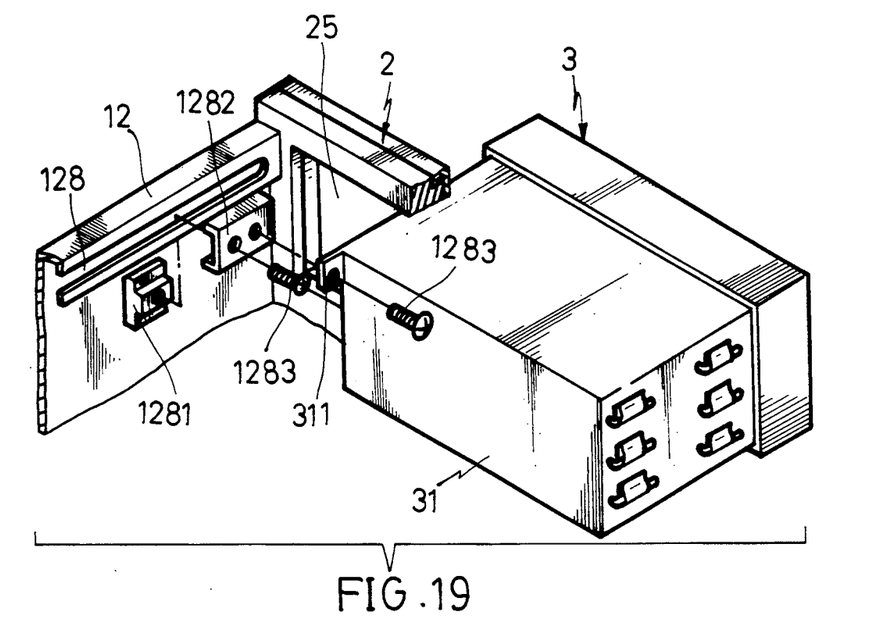
FIG. 19 is an exploded perspective view of the disk drive housing unit of the second embodiment of the present invention.
Figure 20:
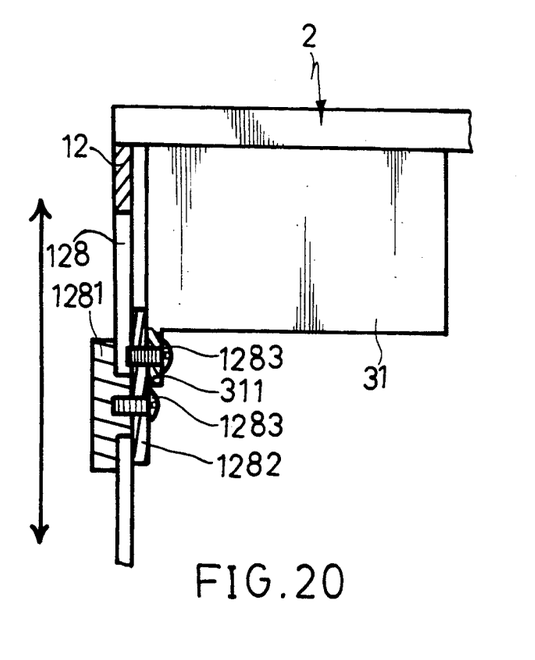
FIG. 20 is a fragmentary sectional view showing the disk drive housing unit of the second embodiment of the present invention fastened into place.

Referring to FIGS. 19 and 20, in the second embodiment of the present invention, the disk drive housing unit 3 is fastened in the mainframe housing unit 1 through side-mounting process. As illustrated, the base frame 12 has an elongated sliding track 128 internally disposed at one side with a sliding block 1281 movably set therein. The lug 311 at the rear end of the rectangular casing 31 of the disk drive housing unit 3 is secured to the sliding block 1281 by screws 1283 via a connecting plate 1282. Therefore, the disk drive housing unit 3 can be drawn out of the mainframe housing unit 1 and then pushed back into place.

Figure 21:
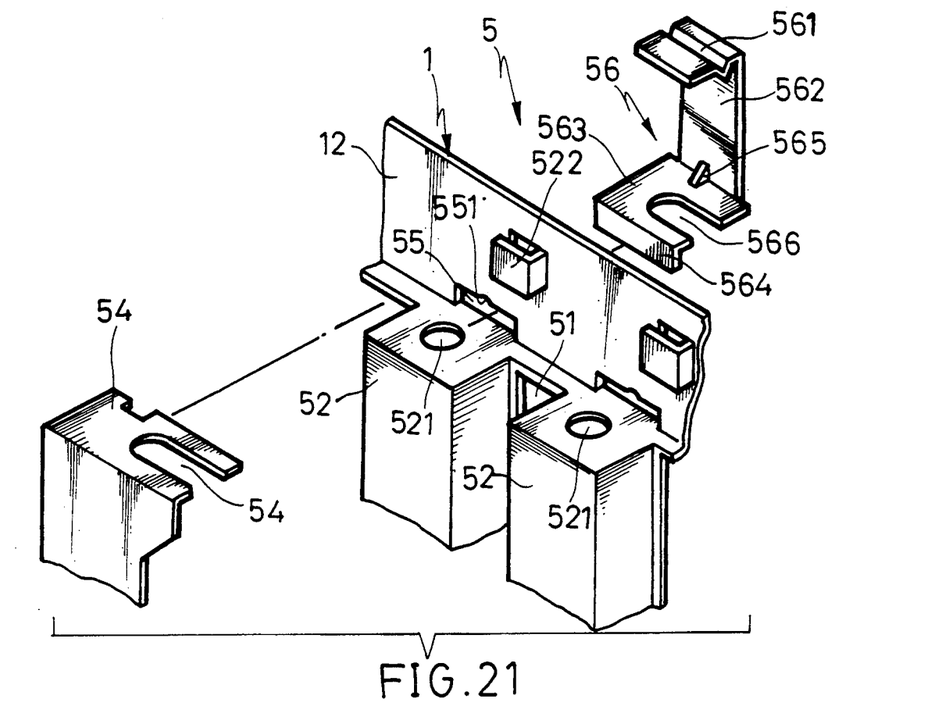
FIG. 21 is an exploded perspective view of an alternate form of interface card fastening unit according to the present invention.
Figure 22:
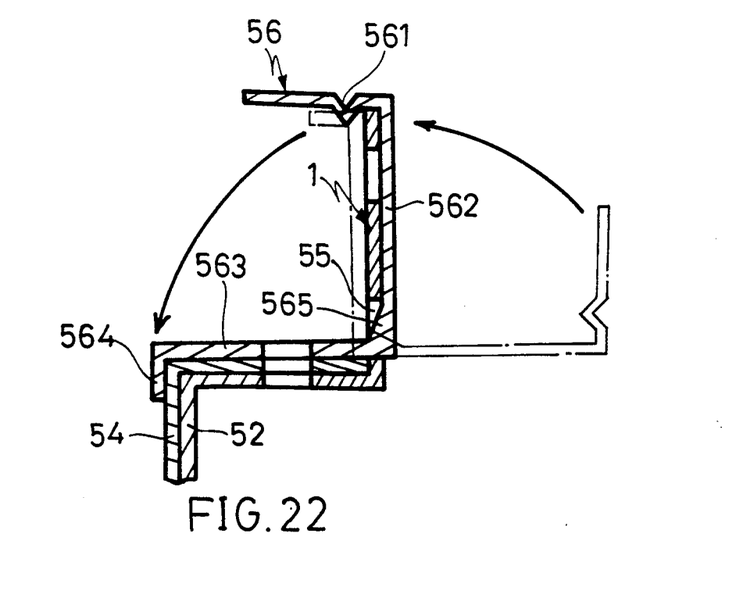
FIG. 22 is a fragmentary sectional view showing the positioning of the interface card fastening unit on a support and a clamp on the base frame to hold an interface card in position.
Figure 61:
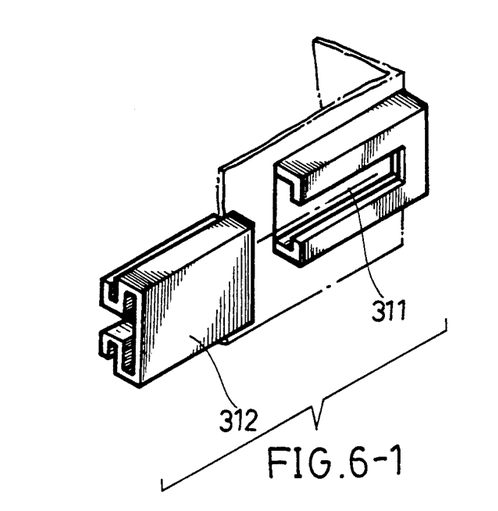
Figure 121:
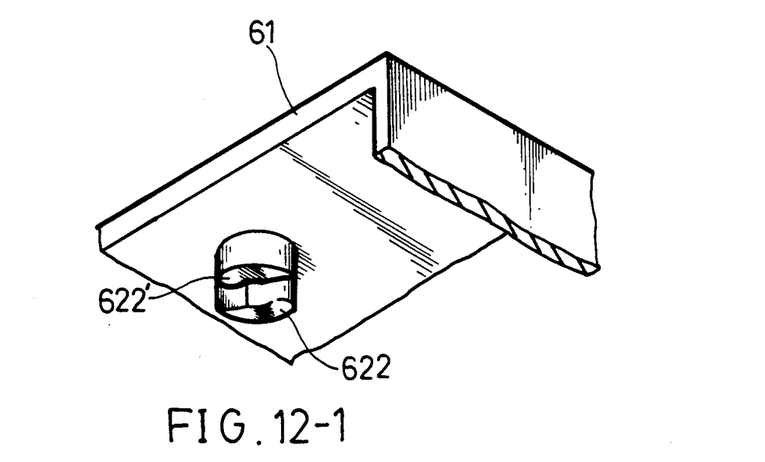

Referring to FIGS. 21 and 22, therein illustrated is an alternate form of the interface card fastening unit 5. As illustrated, there is an elongated slot 55 made on the base frame 12 at the back of each support 52 for holding a retainer plate 56, which elongates slot 55 has a curved notch 551 at the top middle. The retainer plate 56 comprises a body portion 562 transversely disposed at the middle, a hooked portion 561 vertically disposed at one end, a positioning portion 563 vertically disposed at an opposite end and in parallel with said hooked portion 561, a stop plate portion 564 vertically extending from said positioning portion 563 at one end spaced from said body portion 562 and in direction opposite to said hooked portion 561, and a positioning rib 565 connected between said body portion 562 and said positioning portion 563, wherein said positioning portion 563 has an opening 566 made thereon; said hooked portion 561 and said body 562 are made in equal width slightly smaller that the length of each elongated slot 55 and slightly smaller than said positioning portion 563. Therefore, the retainer plate 56 can be conveniently inserted in each elongated slot 55 and rotatably retained in place. After having been fastened in an elongated slot 55, the retainer plate 56 is then rotated upwards (see FIG. 22) to carry the hooked portion 561 to hook up with the top edge of the base frame 12, causing the stop plate portion 564 to firmly retain an interface card 54 to the corresponding support 52. When the retainer plate 56 is set into position to firmly retain an interface card 54 to a corresponding support 52, the positioning rib 565 is engaged in the curved notch 551 to firmly retain the retainer plate 56 in place. Further, a fastening screw may be used to fix the retainer plate 56 and the interface card 54 to the corresponding support 52. The interface card 54 has an opening 541 disposed above the fastening hole 521 on the support 52. By fastening a fastening screw through the opening 566 on the positioning portion 563 of the retainer plate 56 into the opening 541 on the interface card 54 and the fastening hole 521 on the support 52, the retainer plate 56 and the interface card 54 are fixedly secured to the support 52.

As indicated, the present invention is to provide a tool-free computer housing assembly which provides numerous features as outlined hereinafter.

1. The front panel unit has two sliding covers mounted thereon through sliding joint for decorative and dust-proof purposes;

2. The front panel unit has a recessed hole covered with a lid for keeping diskettes and small tools;

3. The disk drive housing unit is permitted to slide in the hole on the front panel unit and, disk drive can be conveniently fastened therein by L-shaped fastening rods without using any tools;

4. The disk drive housing unit can be drawn out of the mainframe housing unit so that much free space can be provided inside the mainframe housing unit for mounting or checking mother boards, disk drive power lines or signal lines;

5. Because power supply unit is retained in place by the vertical side wall of the L-shaped supporting board and the stop plate, it is convenient to install or dismount;

6. Each socket for interface card can be conveniently installed through plug-in joint and then firmly retained in place by the plate spring of each fastening plate without the use of any tools;

7. A mother board can be conveniently fastened in the elongated frame by fastening elements through finger operation, which fastening elements can be respectively conveniently removed from place though rotary motion and by means of the spring force of each corresponding compression spring;

8. The top cover can be conveniently fastened to the base frame by plug-in joint permitting the two hooks thereof respectively hooked in the two retaining holes on the base frame, without the help of any tools; 9. The whole assembly can be conveniently assembled or disassembled with hands without the use of any screws or the help of any tools or, as an alternate procedure, screw means can also be used to fasten the assembly tightly into shape; and 10. The unit parts are detachable or can be drawn out of the main frame housing unit, and therefore, the mother board fastening unit can be conveniently directly fastened inside the main frame housing unit from the top. This top loading process eliminates the disadvantage of conventional computer housing structure which is relatively weak in structural strength due to the arrangement of two open spaces at two opposite sides for mounting a mother board through side loading process.

What is claimed is:

1. A computer housing assembly, the improvement comprising:

a mainframe housing unit consisting of rectangular base having upstanding, opposed side walls, an upstanding rear wall and a rectangular cover plate having edges adapted to rest on said walls, first releasable fastening means carried by the upper portions of said side and rear walls and the corresponding edge portions of said plate connecting said cover plate to said base;

a front panel forming the upstanding front wall of said unit, second releasable fastening means connecting said panel and said base and side walls, said front panel having a left side recess and lid therefor, a center slot opening for receiving a disk drive and a right opening for receiving a disk drive housing, said panel having opposed channels on the upper and lower surfaces and left and right covers slidably mounted therein for covering the left recess and lid and right opening;

a rectangular disk drive housing slidably received in said unit through the right opening in said front panel, said housing having upper, lower, back and side walls, said side walls having a plurality of aligned mutually spaced holes and retaining clips mounted adjacent thereto, said right opening defining channels at the sides thereof and mutually spaced rails mounted on the sides of said housing and being slidably retained in said channels, a supporting track mounted within said unit and a block mounted on said housing and slidably received in said supporting track, L-shaped fastening rods extending through the holes in the side walls for threadedly engaging a disk drive, the legs of said rods being retained in the clips mounted adjacent the holes;

a power supply holder including a L-shaped support platform mounted within the mainframe housing with a leg of said platform resting on said base and a stop plate mounted on the platform a predetermined distance from a vertical wall of said mainframe housing so that a power supply unit can be supported on said platform between said stop plate and wall;

an interface card fastening housing, the upstanding rear wall of said mainframe unit forming a plurality of vertically directed slots, said interface card housing being mounted within the unit registered on the slots, said housing having a vertical support disposed on each side of each slot, a plurality of unitary clamps mounted above said slots and a plurality of fastening plates mounted on each pair of adjacent supports to retain interface cards in said slots; and mother board fastening housing having an elongated frame mounted within said unit with a plurality opf mutually spaced vertical tubes extending therethrough, each tube having two eccentric flanges disposed around the bottom end thereof and a plurality of fastening element having an expanded head and an elogated body extending through each tube so that when a mother board is mounted on said housing tubes will extend through holes therin with the head of said fastening elements retaining said booard thereon, each element further having a biased, split cone at the end thereof extending from the bottom of each tube said cone normally having a diameter greater than that of the tube and being disposed between said flanges so that rotation thereof will compress said cone between said flanges so that said element can be withdrawn through said tube.

2. The assembly of claim 1 further comprising at least one disk drive set having mutually spaced threaded holes on the sides thereof in registration with a row of holes in said disk drive housing so that the threaded ends of said L-shaped rods extend through holes in said housing are threadedly received in the holes in said set to retain said set in said housing. the legs of said rods being retained in respective clips.

3. The assembly of claim 1 wherein movement of said disk drive housing toward or away from the wall of said mainframe unit is controlled by movement of said block in said track and said rails in said channels.

4. The assembly of claim 1 wherein each of said mother board fastening elements is based by a compression spring disposed between the expanded head and the top of each tube.

5. The mainframe housing unit of claim 1 wherein the first fastening means comprises a plurality of mutually spaced, depending hooks disposed along opposite edges of said cover plate and a control plate with a depending flange hingedly mounted on said cover plate and a plurality of holes disposed on the side walls in registration with said hooks and a locating strip on rear wall in registration with said control plate.

6. The assembly of claim 1 wherein said disk drive housing supporting track is mounted on a side wall of said mainframe unit and the eye is mounted on a side wall of said disk drive housing adjacent said track.

7. The assembly of claim 1 wherein said disk drive housing supporting track is mounted on the base of said mainframe unit and the block is mounted on the back wall of said housing.

8. The computer housing of claim 1 wherein said mainframe housing unit, said front panel, said disk drive housing, said power supply holder, and said mother board fastening housing are removably mounted so that the mother board fastening housing can be mounted in said mainframe housing unit through the top thereof with the rectangular cover plate removed with said base frame having integral side and back walls vertically extending upwardly from a flat bottom wall to provide with the front panel the computer housing assembly.

* * * * *